United States Patent [19]

Siegl

[11] Patent Number: 4,881,404

[45] Date of Patent: Nov. 21, 1989

[54] DIESEL ENGINE SIMULATOR AND A METHOD OF ADJUSTING THE DYNAMIC RUNNING CHARACTERISTICS OF A DIESEL ENGINE

[75] Inventor: Walter Siegl, Zurich, Switzerland

[73] Assignee: Sulzer Brothers Limited, Winterthur, Switzerland

[21] Appl. No.: 165,830

[22] Filed: Mar. 9, 1988

[30] Foreign Application Priority Data

Mar. 19, 1987 [CH] Switzerland ............... 1038/87

[51] Int. Cl.$^4$ ........................................... G01M 15/00
[52] U.S. Cl. ..................................... 73/119 A; 123/357
[58] Field of Search ................ 73/116, 865.6, 117.3, 73/118.1, 119 R; 123/357

[56] References Cited

U.S. PATENT DOCUMENTS 3,867,918  2/1975  Williams et al. .................. 123/357

FOREIGN PATENT DOCUMENTS 2055214  2/1981  United Kingdom .
2118325  10/1983  United Kingdom .
2173007  10/1986  United Kingdom .

OTHER PUBLICATIONS

J. W. Freestone et al., The Diagnosis of Cylinder Power Faults in Diesel Engines by Fly Wheel Speed Measurement, Mechanical Engineering Publication, Ltd., London (GB), Mar. 1985-pp. 15-24.

Primary Examiner—Jerry W. Myracle
Attorney, Agent, or Firm—Kenyon & Kenyon

[57] ABSTRACT

The method enables the dynamic running characteristics of diesel engines to be adjusted by use of a simulator via an electronic speed governor R for controlling the fuel pump injection. The method allows simulation of the number of cylinders and number of strokes of the diesel engine under adjustment, and variation of the torque curve of individual cylinders. It is also possible to test the running of the diesel engine and its governor (R) under load changes of the most diverse kinds, such as load reduction or complete or partial failure of a cylinder. The simulator includes blocks for generating signals corresponding to an injection pump setting, for simulating the torque curve or curves of the engine cylinders and integrating the generated torque signals including on-load torque and disturbance signals to form a speed signal. A voltage/frequency convertor converts the speed signal to a frequency signal for output to the electronic governor.

19 Claims, 1 Drawing Sheet

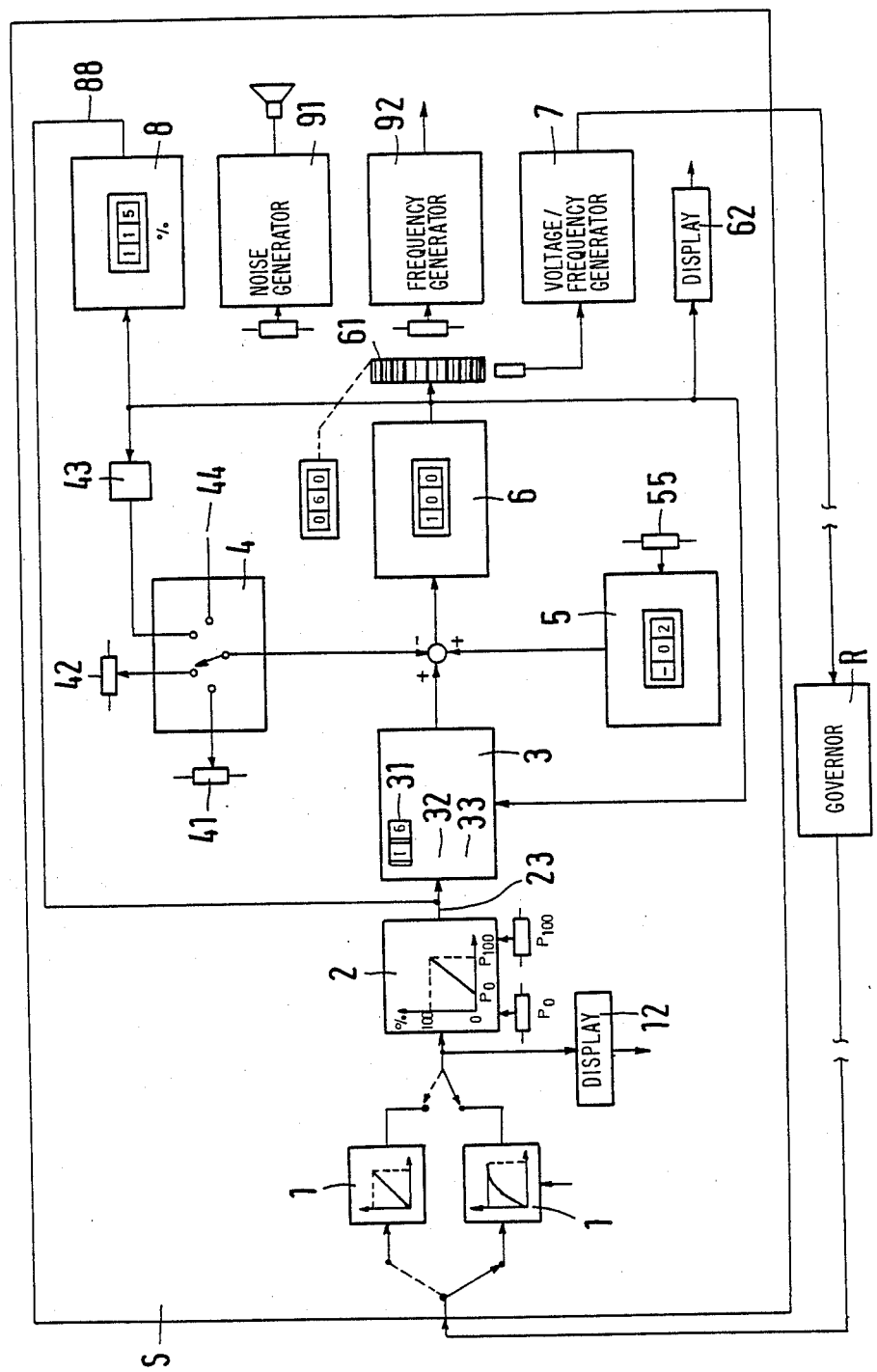

DIESEL ENGINE SIMULATOR AND A METHOD OF ADJUSTING THE DYNAMIC RUNNING CHARACTERISTICS OF A DIESEL ENGINE

This invention relates to a diesel engine simulator and to a method of adjusting the dynamic running characteristics of a diesel engine. More particularly, this invention relates to a method of adjusting the dynamic running characteristics of a diesel engine by controlling fuel pump injection by means of an electronic speed governor.

Heretofore, the dynamic running characteristics of diesel engines, particularly large diesel engines, have been adjusted at the engine itself by electronic speed regulation. However, adjusting the speed governor on a large diesel engine itself has been very time consuming and may take a complete working day or even longer. Further, specific additional equipment, such as hydraulic brakes or other torque brakes are required in order to generate the loads and load changes occurring during operation of the engine. Again, such additional equipment may require many hours to set-up. Still further, the trial running of a large diesel engine is expensive in terms of fuel and the highly skilled personnel required for test operation. Such costs may easily run into several thousand dollars per hour of operation.

Accordingly, it is an object of the invention to be able to adjust the dynamic running characteristics of a diesel engine in a simple economical manner.

It is another object of the invention to be able to adjust the dynamic running characteristics of a diesel engine in a relatively short time.

It is another object of the invention to considerably reduce the amount of time and expense in subjecting a large diesel engine to a trial run for adjustment purposes.

Briefly, the invention provides a diesel engine simulator which is constructed to simulate the dynamic running characteristics of a diesel engine and which is to be connected with an electronic governor. The electronic governor, in turn, may be connected to a diesel engine, for example, to a fuel pump thereof in order to control the fuel pump injection in dependence upon an output signal from the simulator.

The diesel engine simulator is comprised of at least one input stage for receiving an input signal from the electronic speed governor and emitting a corresponding voltage signal to an injection pump simulation block for simulating an injection pump setting. This block, in turn, is constructed to emit a corresponding torque signal to a diesel engine simulator circuit in order to emit a speed signal corresponding to the torque signal. In addition, at least one adjustable torque-load simulation block may be included in the simulator for superimposing a signal on the signals of the diesel engine simulator circuit so as to simulate load variations and disturbances.

The simulator also includes a convertor for converting the resultant simulated speed signal from the simulator circuit to a frequency signal for output to the electronic speed governor.

The method of adjusting the dynamic running characteristics of the diesel engine relies upon a controlling of the amount of fuel injected by a fuel injection pump. To this end, the method comprises the steps of connecting the electronic speed governor to the fuel injection pump for controlling the amount of fuel injected. In addition, a signal output from the governor is emitted to the diesel engine simulator so that a signal can be generated in the simulator in response to the signal input so as to simulate the injection pump setting. A signal is also generated to simulate the torque curve of the diesel engine with a maximum amplitude corresponding to the simulated injection pump setting. Still further, a signal corresponding to an on-load torque of the diesel engine as well as a signal corresponding to a torsional vibration of the diesel engine may be generated. All of these torque signals are then integrated to produce a speed signal which is subsequently converted to a frequency signal in the simulator and emitted to the electronic governor in order to adjust the governor and, thus, the fuel injection pump.

The simulator circuit together with the electronic speed governor form a closed control circuit. With this method, it is possible for the control electronics to be set up ready for operation in the laboratory for the specific operating conditions of the diesel engine. For example, in the case of a large diesel engine, it is possible simply to carry out a short trial run using the adjustment found in the simulator and, if necessary at all, make any fine corrections, thus saving considerable amounts of time and expense in comparison with the previous setting up process. In addition, the method enables the most diverse settings of the dynamic running characteristics of a diesel engine to be tried out and a selection to be made from a number of possible adjustments so that the optimum can be selected in each case. This has been practically impossible with the prior art adjustment procedure owing to the costs and time required.

The method is suitable both for four-stroke and two-stroke diesel engines, a simulator advantageously being constructed so as to be switched to either type. Simulation of the torque characteristics of the engine by means of the torque curve of the individual cylinders provides particularly versatile facilities in setting up the engine. By varying the torque curve of individual cylinders it is possible, for example, to check the behavior of the diesel engine in the event of a power fall-off or complete failure of one or more cylinders The method also offers advantages with respect to the training of personnel on the diesel engine, since it is now possible to carry out an adjustment of the dynamic characteristics of the engine, i.e. of the electronic governor, at the simulator and to carry out extensive tests at the simulator without any need for an actual engine. In addition, the simulation can be used to try out and for teaching a number of states of operation and their effect on the dynamic speed and operating characteristics of the simulated engine. This feature was heretofore quite impossible for reasons of costs and time in view of the current variety of large diesel engines, for example. It is thus possible to give staff much more versatile training at much reduced costs.

These and other objects and advantages of the invention will become more apparent form the following detailed description taken in conjunction with the accompanying drawings wherein.

The Figure illustrates a block schematic of a simulator constructed in accordance with the invention.

Referring to the drawing, an electronic governor R for the diesel engine is interconnected with a simulator S via a suitable input and output. Of note, governors for diesel engines are marketed, for example, by Messrs. Woodward Governors Co., and do not require any further description.

The simulator S is made up of a number of functional groups or blocks, the construction of which and, where possible, the mechanical equivalent of the signals at the diesel engine will be described hereinafter.

The simulator S includes a pair of input stages 1, 1' which are connected in parallel for receiving an input signal from the electronic speed governor R. In the example illustrated, the input stage 1 is a voltage driver having an amplification factor of 1 and the input stage 1' comprises a delay network and a current-voltage converter as driver stage. Depending upon the type of electronic governor R used, the governor output is connected to one or other input stage. The output signal of these two input stages 1, 1' is advantageously standardized, in this case, for example at 10 volts. This standardized signal range, for example from 0 to 10 volts, corresponds in the diesel engine to the range of movement of the adjustment means for the injection pumps or, where only one is provided, the injection pump.

Block 2 is selectively connected to the stages 1, 1' to emit a signal corresponding to the input signal and simulating an injection pump setting. To this end, the block 2 is a voltage/voltage converter and simulates the injection pump setting, i.e. corresponds to the injection pump setting mechanically. More particularly, the output voltage of this converter 2 simulates the maximum torque P generated in each cylinder of the diesel engine according to the amount of fuel injected. In diesel engines, reference is frequently made to MEDT (Maximum Engine Developed Torque). In this example, the output signal of 10 volts from input stage 1 or 1' corresponds to 100% maximum torque, i.e. $P_{100\%}$. With a correspondingly smaller output signal from converter 2, i.e. mechanically a smaller injection and correspondingly a different position of the adjusting means, the torque is correspondingly small and $P_{0\%}$ corresponds to the torque at the start of ignition, i.e. on injection of the minimum amount of fuel required for self-ignition Block 3 is part of a diesel engine simulator circuit with block 6 and consists basically of saw-tooth generators or a single saw-tooth generator, whose maximum signal amplitude is determined by the output signal MEDT of block 2. The saw-tooth signal corresponds to the torque curve of each cylinder in dependence on the angle of rotation of the crankshaft. The number of cylinders of the simulated engine is selected externally at a multiple switch 31, and the type of engine cycle, i.e. 2 or 4 stroke, can be selected at a toggle switch 32. In addition, in the example illustrated, it is possible to switch off one of the engine cylinders by means of a switch 33, i.e. to simulate its breakdown. Provision could also be made for disconnecting a number of cylinders of the simulator and/or not completely switching off the cylinder or cylinders but simply simulating a power reduction at individual cylinders. This could be effected electronically, for example, by reducing the MEDT signal for some of the cylinders. The value of the MEDT signal thus determines the maximum amplitude of the sawtooth signals. The choice of the type of cycle determines the frequency of the saw-tooth signals. A number of cylinders in the simulated engine can be selected between one and, for example, twenty four or some other number and, for example, determines the phase-shift of the saw-tooth signals, the superposition of which represents the torque curve of the simulated diesel engine. In order to represent the torque curve of a diesel engine as faithfully as possible, provision can be made for the torque to be adjustable a certain amount, for example, ±10% between the individual cylinders and/or from ignition to ignition, or may be changed automatically, by varying the maximum amplitude of the saw-tooth signals within certain limits, e.g. by random generator control.

Block 4 generates a signal which corresponds to the on-load torque of the diesel engine, this load being represented basically by a standardized voltage signal. By way of example, the 100%-load is represented by a 10 volt signal. The starting characteristic of the diesel engine is simulated, for example, by switching in a part-load 41 first, followed by the full-load 42 after some time. It is also possible to simulate other usage-specific loads and load curves via other input channels, e.g. the load curve per unit of time of a variable-pitch screw having an ALPHA$n^2$ characteristic at a channel 43, it being possible to standardize ALPHA to 1 with n denoting the speed. Another channel 44 enables another load to be simulated by means of a load curve generator.

Block 5 is a circuit for simulating torsional vibrations of a specific order. This block 5 is basically a sine generator synchronized with the speed of the simulated diesel engine. The torsional vibrations of the 1st and $n^{th}$ order (n=number of cylinders) can also be derived directly from the circuit of block 5.

The speed, i.e. the speed signal of the simulated diesel engine, is generated in block 6. This block is basically an integrator in which the torque resulting from the diesel engine and loads, i.e. the torque signal, is integrated over time in accordance with the equation:

$$N_{eng} = \frac{1}{J} \int_0^t (M_{eng} - M_{load}) \, dt + N_{eng}(t=0)$$

where $N_{eng}$ is the diesel engine speed $M_{eng}$ is the torque developed by the diesel engine cylinders $N_{eng}$ is the diesel engine speed at the time t=0, in rpm $M_{load}$ is the on-load torque and the torque of the disturbance or malfunctions J is the total moment of mass inertia.

Since the simulator S operates with standardized values and variables, the moment of mass inertia J has to be calculated by inputting the standardized signal GAMMA, i.e. the acceleration factor, a variable specific to each diesel engine, in accordance with the equation:

$$\text{GAMMA} \, (\% \, N_{100/sec}) = \frac{9 \times 10^6 \times P_{eng} \, (KW)}{N_{eng}^2 \, (RPM) \times J \, (kgm^2)}$$

where

GAMMA is the acceleration factor as a percentage of the nominal speed $N_{100}$ is 100% of the nominal speed $P_{eng}$ is 100% of the nominal power of the diesel engine J is the total moment of mass inertia.

The output signal of block 6 is symbolized by the toothed flywheel 61 and, in the simulator, is a voltage, the magnitude of which represents the speed. However, the governor R requires a frequency, for example, as an input signal for the speed. Thus, the frequency corresponding to the speed is generated in a block 7 which comprises a voltage/frequency converter and is fed to the governor R.

Block 8 is a speed limiter which has to stop the engine when an adjustable maximum speed is reached. At a speed of, for example, 115% of the nominal speed this would mean triggering the switching-off process in the simulator when the output voltage of the block 6 reaches 11.5 volts. For example, block 8 may be a threshold switch. The stop signal from this speed limiter 8 is fed via a line 88 to a switch disposed in a line 23 connecting block 2 (which simulates the injection pump) and block 3, and immediately results in the simulated diesel engine being switched off when the simulator simulates an excessive speed.

The simulator S may also have a display 12 for the simulated position of the injection pump linkage or a display 62 for the speed, and displays for other variables which may be of interest for certain purposes.

A noise corresponding to the running of the diesel engine can be generated by a noise generator 91 to make the simulation even more realistic.

A frequency generator 92 may be added, for example, to allow generation of any frequencies related to a specific variable of the simulated diesel engine, e.g. its power.

The circuits and components represented by the individual blocks are well known and familiar to the electronics specialist and are also adequately described in the literature. From his professional knowledge and the above explanations in connection with the block schematic diagram he will also be able to link up the circuit modules and dimension them accordingly, i.e. make a device for performing the method and work the method.

The invention thus provides a diesel engine simulator which is relatively simple construction which can be used for adjusting the dynamic running characteristics of a diesel engine.

The invention further provides a method of adjusting the dynamic running characteristics of a diesel engine by controlling the amount of fuel injected by a fuel injection pump in a relative minimum of time with a minimum of expense.

The invention further provides a method which enables the running time and testing on an actual diesel engine to be restricted to a fraction of the time or even be completely eliminated.

The invention further provides a method and simulator which is suitable for training operators and maintenance staff.

What is claimed is:

1. A diesel engine simulator comprising
   at least one input stage for receiving an input signal from an electronic speed governor and emitting a corresponding voltage signal;
   an injection pump simulation block for simulating an injection pump setting, said simulation block being connected to said input stage to receive said voltage signal and emit a corresponding torque signal;
   a diesel engine simulator circuit connected to said simulation block to emit a speed signal corresponding to said torque signal;
   at least one adjustable torque-load simulation block for superimposing a signal therefrom on said speed signal of said diesel engine simulator circuit; and
   a convertor for converting a resultant simulated speed signal from said diesel engine simulator circuit to a frequency signal for output to the electronic speed governor.

2. A diesel engine simulator as set forth in claim 1 wherein said diesel engine simulator circuit has saw tooth generators for simulation of the torque generated by the cylinders of a diesel engine.

3. A diesel engine simulator as set forth in claim 1 wherein said diesel engine simulator circuit includes an integrator for integrating a torque signal corresponding to the simulated cylinder torques, an simulated on-load torque, a simulated torsional vibration and a simulated moment of mass inertia in accordance with the equation:

$$N_{eng} = \frac{1}{J} \int_0^t (M_{eng} - M_{load}) \, dt + N_{eng}(t = 0)$$

where
$N_{eng}$ is the diesel engine speed
$M_{eng}$ is the torque developed by the diesel engine cylinders
$N_{eng}$ is the diesel engine speed at the time t=0, in rpm
$M_{load}$ is the on-load torque and the torque of the disturbance or malfunctions
J is the total moment of mass inertia.

4. A diesel engine simulator as set forth in claim 3 wherein said integrator comprises a standardization signal input for standardizing the moment of mass inertia in accordance with the equation:

$$\text{GAMMA} \, (\% \, N_{100/sec}) = \frac{9 \times 10^6 \times P_{eng} \, (KW)}{N_{eng}^2 \, (RPM) \times J \, (kgm^2)}$$

where
GAMMA is the acceleration factor as a percentage of the nominal speed
$N_{100}$ is 100% of the nominal speed
$P_{eng}$ is 100% of the nominal power of the diesel engine
J is the total moment of mass inertia.

5. A diesel engine simulator as set forth in claim 1 wherein said converter is a voltage/frequency converter.

6. A diesel engine simulator as set forth in claim 1 which further comprises a threshold switch for generating a shut-off signal for the simulated diesel engine when the simulated diesel engine speed reaches an adjustable maximum permissible value.

7. A diesel engine simulator as set forth in claim 1 wherein said diesel engine simulation circuit includes adjusting means for selecting the number of cylinders and the cycle of the simulated diesel engine.

8. A diesel engine simulator as set forth in claim 1 which further comprises a switching element in said adjustable torque-load simulation block for varying said signal thereof.

9. A diesel engine simulator comprising
   a pair of input stages connected in parallel for receiving an input signal from an electronic speed governor, one of said stages being a voltage driver and the other of said stages being a current-voltage converter;
   a voltage/voltage convertor selectively connected to said stages to emit a signal corresponding to said input signal and simulating an injection pump setting;

a generator for generating a signal corresponding to a torque curve of the cylinders of a diesel engine;

a block for generating a signal corresponding to an on-load torque of a diesel engine for superposition on said torque curve signal;

an integrator for integrating the superimposed torque signals over time to emit a speed signal simulating the speed of the diesel engine; and a voltage/frequency convertor for converting said speed signal to a frequency signal for output to the electronic speed governor.

10. A diesel engine simulator as set forth in claim 9 wherein said generator is a saw-tooth generator.

11. A diesel engine simulator as set forth in claim 9 which further comprises a block for emitting a signal simulating torsional vibrations of predetermined order for superposition on said torque curved signal.

12. A diesel engine simulator as set forth in claim 9 which further comprises a speed limiter connected to said integrator for generating a shut-off signal in response to an excessive speed signal being generated.

13. A diesel engine simulator as set forth in claim 9 wherein said generator includes a switching element for varying said torque curve signal.

14. A method of adjusting the dynamic running characteristics of a diesel engine by controlling the amount of fuel injected by a fuel injection pump, said method comprising the steps of connecting an electronic speed governor to the fuel injection pump for controlling the amount of fuel injected;

emitting a signal output from the governor to a diesel engine simulator;

generating a signal in said simulator in response to said signal output from said generator to simulate an injection pump setting;

generating a signal simulating the torque curve of the diesel engine having a maximum amplitude corresponding to the simulated injection pump setting;

generating a signal corresponding to an on-load torque of the diesel engine;

generating a signal corresponding to a torsional vibration of the diesel engine;

superimposing and integrating the generated torque curve signal, on-load torque signal and vibration signal to produce a speed signal;

converting the speed signal to a frequency signal in the simulator; and emitting the frequency signal to said electronic governor to adjust said governor to control the fuel injection pump.

15. A method as set forth in claim 14 wherein said torque curve signal is formed from the sum of the simulation signals for the torque curve on each individual cylinder of the diesel engine.

16. A method as set forth in claim 14 wherein said signal for simulating the fuel injection pump setting is variable in dependence on the output signal of the speed governor.

17. A method as set forth in claim 14 wherein the simulation signals for the torque curve of individual cylinders are adjustable during simulator operation.

18. A method as set forth in claim 14 wherein said torsional vibration signal is representative of different orders of magnitude.

19. A method as set forth in claim 14 wherein the number of cylinders and/or the cycle of the simulated diesel engine can be varied.

* * * * *

UNITED STATES PATENT AND TRADEMARK OFFICE
CERTIFICATE OF CORRECTION

PATENT NO. : 4,881,404

DATED : November 21, 1989

INVENTOR(S) : WALTER SIEGL

It is certified that error appears in the above-identified patent and that said Letters Patent is hereby corrected as shown below:

Column 8, line 21 "on" should be -of-

Signed and Sealed this

Twenty-second Day of January, 1991

Attest:

HARRY F. MANBECK, JR.

*Attesting Officer*  *Commissioner of Patents and Trademarks*